June 27, 1933.            R. CARTER            1,915,567
HEATING UNIT FOR HYDROGENOUS AND CARBONACEOUS VALUES RECOVERY
Filed March 23, 1926     2 Sheets-Sheet 1
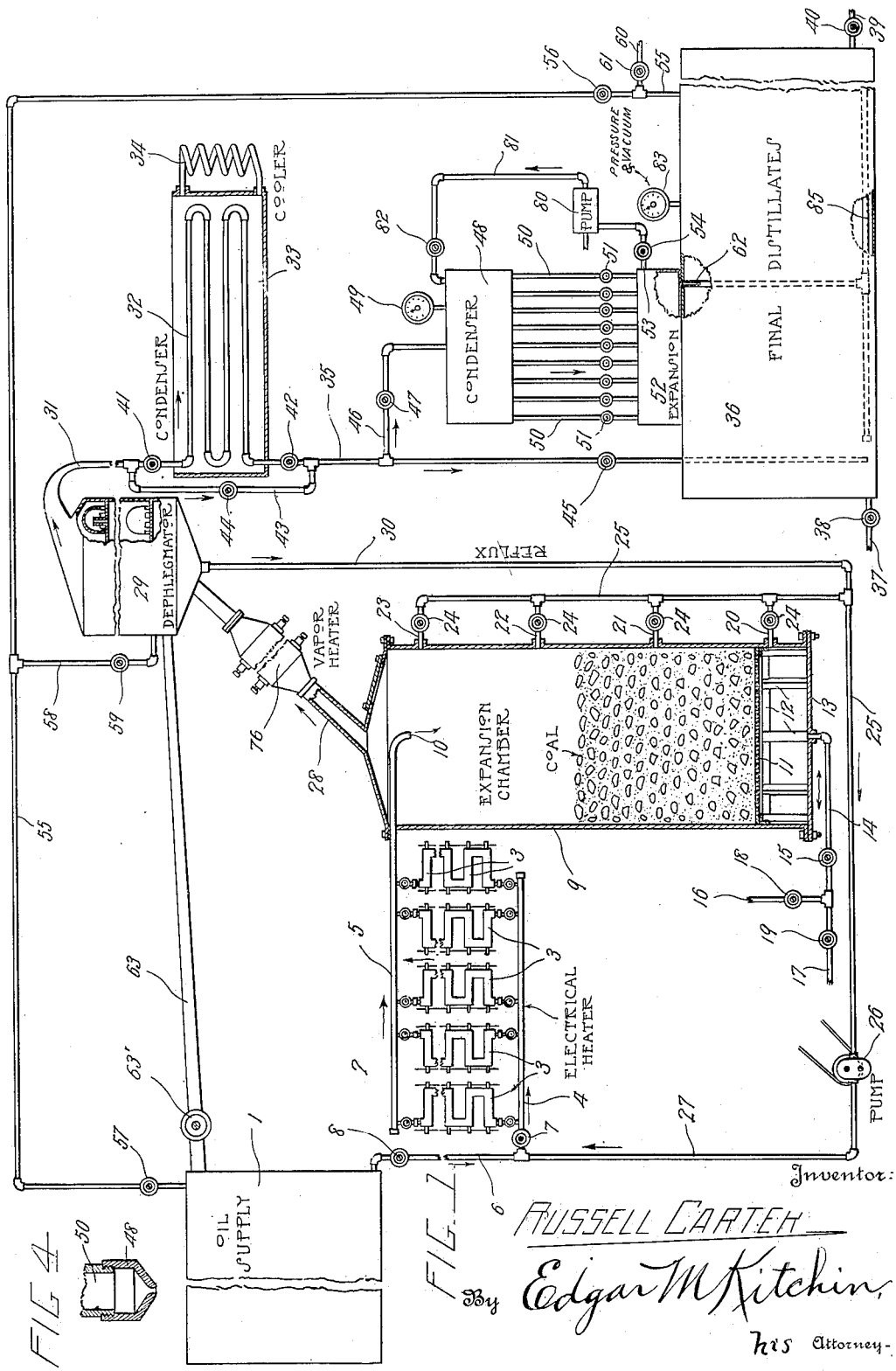

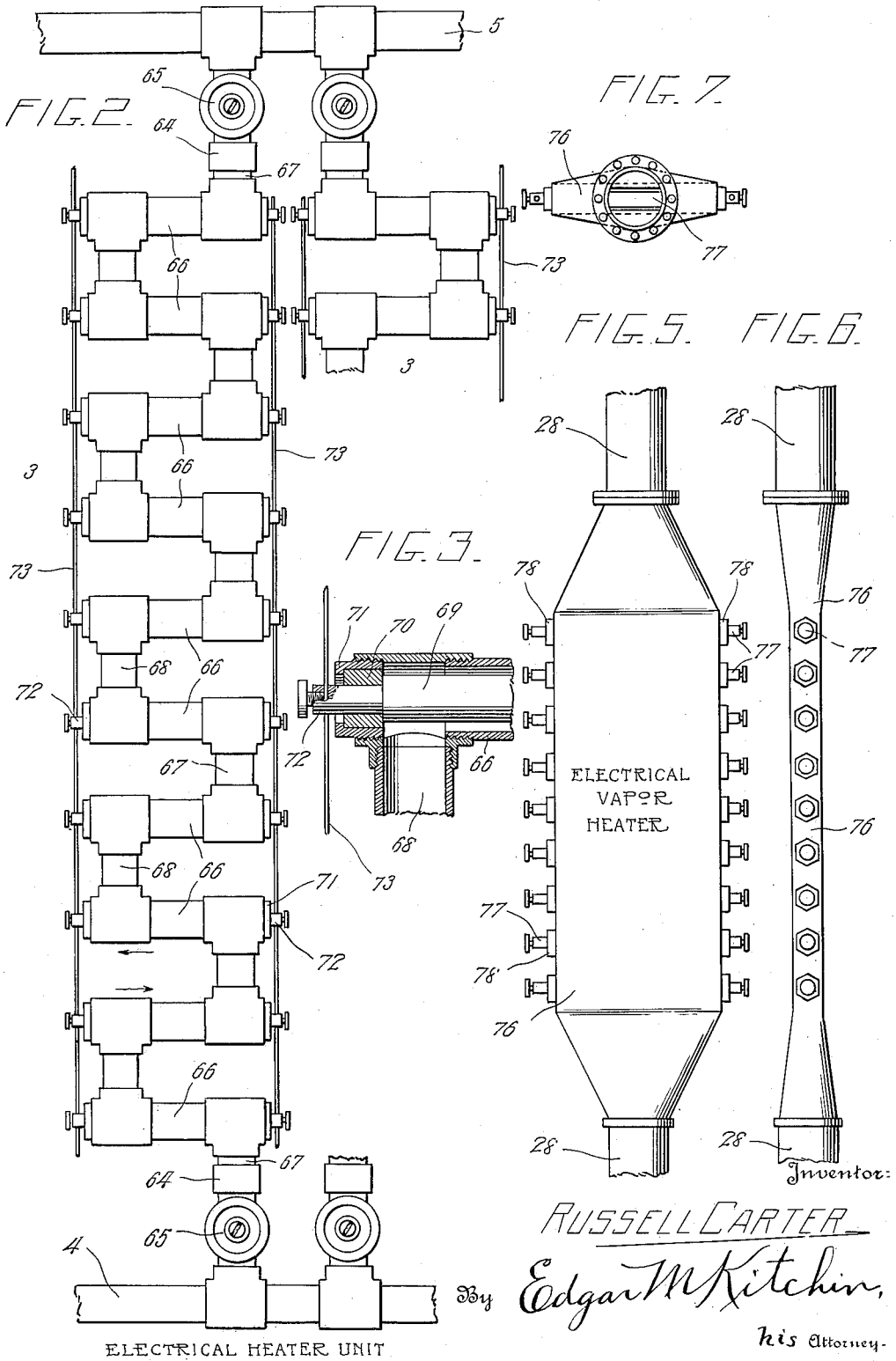

Patented June 27, 1933

1,915,567

UNITED STATES PATENT OFFICE

RUSSELL CARTER, OF WASHINGTON, DISTRICT OF COLUMBIA

HEATING UNIT FOR HYDROGENOUS AND CARBONACEOUS VALUES RECOVERY

Application filed March 23, 1926. Serial No. 96,780.

This invention relates to improvements in the art of recovery of values from carbonaceous and hydrogenous sources, such as crude petroleum, coal, steam, and the like.

The primary object in view is the recovery of fuel values efficiently and inexpensively, and a more detailed object is the effective and successful conversion into commercial products of substantially all values from original sources notwithstanding variations in quality and character of initially supplied fuels and resulting variations necessitated for the treatment and disposal of products therefrom.

A more detailed object in the preferred typification of the invention is the effective utilization of electrical resistances for affording the source of heat.

With these and other objects in view as will in part hereinafter become apparent and in part be stated, the invention comprises certain novel constructions, combinations and arrangements of parts as will be subsequently specified and claimed.

Figure 1 is a diagrammatic illustration of a plant comprehending an embodiment of the structural features of the invention especially well adapted for carrying out the art, parts being seen in section for disclosing interior structure.

Figure 2 is an enlarged, detail, fragmentary elevation of a part of the heating plant.

Figure 3 is a further enlarged, fragmentary sectional view through the end portion of one of the heating units, the resistor and bus line being seen in elevation.

Figure 4 is an enlarged, detailed, fragmentary vertical section through one of the discharge nozzles of the difference-in-pressure reducing system.

Figure 5 is a view in side elevation of a fragment of the vapor line showing an electrical superheater interposed therein.

Figure 6 is a plan view of the parts seen in Figure 5.

Figure 7 is an end view of the super-heater of Figures 5 and 6 detached.

Referring to the drawings by numerals, 1 indicates a source of supply, such as an elevated tank arranged in sufficient proximity to the heater 2 to be initially heated thereby.

The detail construction of the heater 2 is illustrated in Figures 2 and 3. The heater consists preferably of a series of units 3, 3, each receiving a supply from a pipe or header 4, and each discharging into a delivery pipe or exhaust header 5. The header 4 communicates with a supply pipe 6 extending to and communicating with the tank 1. A valve 7 controls the delivery of fluid fuel from pipe 6 to header 4, and a valve 8 controls the delivery from the tank into the pipe 6. The exhaust or discharge header 5 extends into a percolating or cracking chamber 9, and is provided with a discharge spout 10 for delivering the heated oil or other fluid down on top of the contents of chamber 9.

A formaninous false bottom 11 is arranged in the chamber 9 and supported in any appropriate way, such as by framing 12 resting on the removable bottom 13 of the chamber. The plate 11 sustains the solids and provides an open space at the lower end portion of chamber 9 for the accumulation of liquids, and to facilitate distribution of steam or other gases to the solids above the plate 11 from a supply pipe 14. The pipe 14 is valved at 15 for controlling intake or discharge through the pipe. The pipe 14 is also branched at 16 and 17, the branch 16 being adapted to receive a supply of steam, while the branch 17 is designed to direct fluid discharged from the lower end of chamber 9 to a point or points for further treatment, such, for example, as return to the header 4. A valve 18 controls the branch 16, and a valve 19 controls the branch 17. The chamber 9 is provided with a series of vertically spaced discharge pipes, such as seen at 20, 21, 22 and 23, each controlled by a valve 24, and all communicating with a discharge pipe 25 extending to a circulating pump 26 which in turn communicates with a pipe 27 for returning liquids drawn from the chamber 9 to the header 4.

Rising from the top or upper end portion of chamber 9 is the vapor line 28 which communicates with the lower portion of the deflegmator 29. At an appropriate point in the length of the vapor line 28, a super-heater 76 is provided, as shown in detail in Figures 5, 6 and 7 of the drawings and hereinafter described. The deflegmator 29 may be of the ordinary well known conventional type, and is provided with a return leg 30 extending to and communicating with the pipe 25 for returning the heavier liquids to the heater 2.

The deflegmator 29 has its upper portion communicating through a pipe 31 with means for reducing the higher volatiles to a liquid state. One of such means may be the conventional condenser 32 arranged in the chilling tank 33, which latter is adapted to be cooled by refrigerating coils 34. The condenser 32 discharges through a pipe 35 into a tank 36. Pipe 35 is valved at 45 for controlling the discharge into the tank 36. Tank 36 is preferably provided with a drain pipe 37, valved at 38, for drawing off water, or other heavier liquid products. A pipe 39 leads from tank 36 and is valved at 40 for drawing off the blended hydrocarbon fuel in the form of the commercial products. The draw-off pipe 37 communicates preferably at the lowermost point of tank 36, while pipe 39 communicates with a higher point.

While the condenser 32 is preferred for treating some of the heavier of the more volative distillates, it is not essential to use said condenser, and especially when the more highly volatile distillates are being recovered. Such lighter vapors are preferably liquefied by a pressure difference or vacuum-chilling process hereinafter described. To this end, the pipe 31 is valued at 41, and the pipe 35 is valved at 42. A by-pass 43, valved at 44, communicates with the pipe 31 above the valve 41 and below the valve 42, so that by closing the valves 42 and 41 and opening the valve 44, the condenser 32 may be cut out of the system. When the parts have assumed this position, the gases discharging from deflegmator 29 reach the pipe 35 in their gaseous state, and to reduce them to liquid form a branch pipe 46 communicates with the pipe 35, and is valved at 47. Pipe 46 communicates with a tank 48, preferably having the pressure gauge 49. A series of discharge pipes, preferably of relatively small bore, communicate with the lower portion of the tank 48, as indicated at 50, 50, each having a valve 51 and each discharging into a vacuum tank 52. The vacuum tank 52 communicates through a pipe 53, valved at 54, with an injector pump 80 which in turn communicates through pipe 81 with tank 48. Pipe 81 is valved at 82, and pump 80 serves to force fixed gases from tank 52 back into tank 48.

A pipe 55 leads from tank 36 back to the tank 1 for equalization of pressure when the entire system is operating under pressure, the pipe 55 being valved at 56 relatively near the tank 36, and also valved at 57 preferably relatively near the source of supply 1. A branch pipe 58 extends from pipe 55, preferably between the valve 56 and 57, to the deflegmator 29, and is valved at 59. A branch pipe 60 leads from the pipe 55, preferably between the tank 36 and valve 56, and the branch 60 is valved at 61. The branch 60 communicates with a vacuum pump, not illustrated. A pipe 62 leads from the lower portion of tank 52 preferably to the lower portion of tank 36.

Supply tank 1 is preferably arranged to receive waste heat from the heater 2, so that the lighter volatiles rise to the upper portions of tank 1. A discharge pipe or vapor line 63 valved at 63' is, therefore, preferably provided leading from the upper portion of the tank 1 to the lower potion of the deflegmator 29. It is to be observed that the vapor lines 28 and 63 preferably taper toward the deflegmator 29, or, in other words, each has an enlarged receiving end for its source of supply of vapor for facilitating exit of vapor from such source of supply.

The heater 2 may be of any of various types, including the conventional furnace, for this character of work, as indicated in Figure 4 and hereinafter described in detail, but by preference said heater is electrical as indicated and consists of a series of individual units 3 as heretofore mentioned. Each unit 3 communicates at each end through a detachable union 64, and a valve 65 with the respective header 4 or 5, so that by the turning off of the two valves 65 and the opening of the unions 64 any particular unit 3 may be removed and a new one replaced without stopping or in any way interfering with the operation of the balance of the heater. Each of said heating units preferably consists of a number of transversely arranged relatively short sections of pipe 66, each section 66 communicating through a nipple 67 with one end of the adjacent section 66 at one side and through a nipple 68 with the relatively opposite end of the adjacent section 66 at the other side. The terminal sections 66 have their nipples 67 or 68 (as the case may be) communicating with the respective union 64, and thence through the valve 65 to the header. As best seen in Figure 3, each section 66 contains an electrical resistor 69 engaged at each end by an insulator 70 rigidly clamped in place by a sleeve nut 71 threaded into the T-fitting forming the pipe connection between the given section 66 and its respective nipple 67 or 68. The resistor 69 has a reduced shank which may be of metal or otherwise, indicated at 72, projecting beyond the insulation 70 and beyond the sleeve nut 71 and in electrical communication with a bus line 73. As each end of each of the resistors 69 and its connected parts is a duplicate of the other, only one has been shown in detail, and it will be understood that the insulator 70 at one end of each resistor 69 clamped by the nut 71 against the annular shoulder of the resistor 69 at the place of outstanding of the shank 72 is stressed by the said nut 71 toward the other insulator 70 in the direction of the length of the resistor 69, and the resistor 69 is accordingly effectively clamped rigidly in place within its respective pipe section 66. Each resistor 69 is of dimensions sufficient for leaving only a relatively thin wall of crude petroleum, or other fluid fuel to be heated, about it within the respective section 66. Also each resistor 69 is formed of carborundum with a bonding agent utilized in production assuring a stable, solid rod of resisting material having a natural lack of affinity for carbon and affording practically no occasion for short circuiting incrustations. Attempts have been heretofore made or proposed for heating oil by the use of wire resistances of the well known coil type, but in every instance of such attempts, so far as known by me, wholly unsatisfactory and unsuccessful results have followed, because of collections of carbonaceous material on the coils of wire short circuiting areas thereof, lowering the resistance, and causing overload to the point of burning out the resistance. Similar and other objectionable results have followed attempted use of ordinary graphite carbon sticks, but these results do not occur in the use of the carborundum rod resistors 69. While I have referred to each rod resistor 69 as being preferably made of carborundum and an appropriate bonding agent, they may be made of any other material found capable of affording the requisite resistance both to the flow of current and to the eroding influences of hot liquids. Resistors such as are commonly used in electrical furnaces may be employed, such, for example, as the commercially known "glow bars", and I find the use of carborundum in the formation of resistors 69 very valuable from their capacity for prolonged successful use. All resistance heretofore proposed to be used for heating liquid in which they are submerged either rupture from rising resistance and overload, as is the case with coiled wire, or else the resistance is lowered and the heat emanation disastrously reduced, as is true of graphite carbon; whereas with the resistor bar of carborundum the oil or other liquid finding its way into the interstices of the resistor 69 lowers the resistance in about the ratio in which the resistance would otherwise rise, so that the actual resistance remains approximately constant, and continued use of the bar resistor 69 does not lead to an ultimate defective condition. There is no overloading and resulting rupture, and no dropping of heat generation.

It will be obvious that the required difference of potential being maintained between the two bus lines 73 of each of the units 3, the several resistors 69 will have their temperature raised by the current to the glowing point, and the oil approaching from header 4 and flowing toward header 5 will increase in temperature as it advances along the successive pipe sections 66 until, by the time the oil has reached the header 5, it has attained cracking temperature. The pipe fittings utilized in making up each of the units 3 are preferably of the high pressure type.

The vapor line 28, as above stated, is provided with an electrical super-heater 76, such as is illustrated in detail in Figures 5, 6 and 7, in which heater 76 is seen as a flattened drum or housing tapering at its ends to conform to and unite with the adjacent portions of the vapor line 28 and widened and made relatively thin throughout intermediate portions for accommodating a series of electrical heating units, each consisting of a resistor 77 identical in construction and mounting with resistor 69. Each resistor 77 is clamped in place by insulating sleeves corresponding to the insulating sleeves 70 and engaged by sleeve nuts 78, 78, corresponding in structure, function and arrangement to the sleeve nuts 71. Current being supplied to the several resistors 77, the heat produced thereby is delivered to the passing vapors and raises them say to approximately 1800° F., that is sufficiently high to cause the hydrogen in the vapors to combine with the available carbon therein. Carbon freed from the treated coal will be available. It should be understood that no contention is made by me of any special virtue from electrolysis incident to the exposure of the vapor in the case of the vapor heater 76 to contact with the non-insulated surface of current conductors, or of any electrolytic action incident to contact in the units 3 of hydrocarbon oil direct with the non-insulated surface of current conductors. It is my conviction that little, if any, effect is produced by any electrification of the vapor or oil. I reserve, however, to myself the benefit of any possible advantages that may arise incident to electrolytic action that may occur incident to my invention should later experimentation demonstrate that valuable results do flow from such action.

In carrying out that part of the present invention comprising the art or process, current is turned on to the bus lines 73, and fuel, such as crude petroleum, is delivered from tank 1 to header 4, and through the units 3 to header 5, and thence into the chamber 9. Before this operation is started, however, the chamber 9 is charged with the fuel to be cracked, such, for illustration, as a good grade of bituminous coal mixed with calcium oxide. The proportions of the mixture will be varied according to other factors, such as the moisture content of the coal and the ability of the coal to give off free carbon when steam is supplied while the coal is hot. By way of example, coal containing ten per per centum moisture will reduce approximately four hundred pounds of calcium oxide per ton of coal, depending upon the kind and quantity of oxide used. The oxygen will combine with the hydrogen of the moisture and leave the calcium residuum. If steam is to be supplied, a greater amount of the oxide must be proportionally utilized, and the steam must be injected in small quantities at a time so that the temperature will not be too greatly reduced.

The oil or liquid fuel jetting from the spout 10 cataracts upon the solids within the chamber 9 and at first percolates down through the solids. The valve 15 is preferably closed, and the valves 24 of pipes 21, 22 and 23 are also preferably closed. The liquid percolating through the solids fills the lower portion of the chamber 9 to the elevation of the pipe 21, and then flows out through the pipe 21, pipe 25, and pump 26 back to the header 4. The plant is kept on stream, that is this circulation continues until the liquid passing the heater 2 reaches a cracking temperature. Thereupon vapors begin to rise through the vapor line 28 and the circulation continues with ever increasing temperature of the solids in chamber 9 until the solids begin to crack also and their vaporous vapors rise to mingle with that of the inflowing and cracking oil, and the mingled vapors pass out through the vapor line 28 to the deflegmator 29. This operation continues until the solids in the chamber 9 have either melted or coked. When melting, portions of the liquefied solids, mingling with the descending oil, will remain fluid and pass on with the oil. During the operation to this point, the moisture within the coal will have been driven off and the hydrogen therefrom combining with free carbon from the solids either in the cracking chamber or in the super-heater, passing off as a hydrocarbon vapor, and the oxygen meanwhile is taken care of by the oxide. The solids may then be further and largely reduced by the injecting of steam while the solids are maintained hot incident to the continuation of the oil circulation and delivery to chamber 9 at a cracking temperature. The plant will be continued on stream until not only pipe 20 has been clogged, but all of pipes 21, 22 and 23 successively clogged. When the last-named pipe has ceased to discharge into pipe 25, the plant must be shut down and chamber 9 cleaned out. Under certain conditions, it may be desirable to carry out the cleaning out process at an earlier period. The residuum from the calcium oxide employed blending with the asphaltum products from the coal and oil will produce an improved paving asphaltum. The chamber 9 may be cleaned out readily by the removal of the bottom 13, the frame-work 12, and false bottom 11. After the clean-out, a new charge is supplied and the operation is repeated. To avoid delay incident to cleaning chamber 9, two such chambers may be provided, and pipe 5 and vapor line 28 branched thereto, so that one of the chambers may be in use and the plant kept on stream while the other is being cleaned.

While the cracking process is progressing as stated, the heat from heater 2, raising the temperature of the contents of the supply tank 1 (said tank being preferably especially located to receive the waste heat) will cause the lighter volatiles in tank 1 to rise to the upper part thereof and to discharge through vapor line 63 to the deflegmator 29.

The substances moving through vapor lines 28 and 63 to the deflegmator 29 which are too heavy to go over the top of the deflegmator are discharged down the pipe 30 and back into the circulating pipe 25. The lighter vapors pass over the deflegmator and down through the condenser 32 and into the tank 36. While this is occurring, the valves 41 and 42 are open and the valves 44 and 47 are closed. During this operation the pressure is maintained equalized throughout the system by the opening of the valves 56 and 57 and the closing of the valves 51, 54 and 61.

However, it may become desirable to treat vapors without the use of the condenser 32, and this is especially true with the more volatile vapors. The pressure difference or vacuum chilling operation is then utilized. For this purpose, the valves 38, 40, 41, 42, 45, 54 and 56 are closed, and valves 44 and 47, 51, 59 and 61 are opened. Of course, if pump 80 is operating valves 53 and 82 will be open. By the exhaustion through pipe 60, a partial vacuum is created in the tank 36 and in the tank 52 while the system pressure continues on the vapor within the tank 48. Said vapor is, therefore, discharged in a series of relatively fine streams through pipes 50 into the vacuum area of the tank 52, and the resulting expansion of the gas as it enters the tank 52 causes a lowering of the temperature which produces condensation of such gas. The liquid thus produced then flows down the pipe 62 into tank 36, and is usually accompanied by certain unreduced fixed gases which pass up through the body of liquid in container 36 and are further chilled thereby, and mingling therewith are to a further degree reduced to liquid. When this operation occurs immediately following the delivery of liquid condensates directly to the tank 36 from the condenser 32, the liquid condensates of the lighter gases will blend in tank 36 with the heavier condensates, and the resulting distillate will be highly saturated, and a relatively small amount of uncondensed gases will remain. Of course, the uncondensed gas drawn off through pipe 60 may be compressed and returned to the system for further treatment or otherwise utilized.

It will, of course, be readily understood that while a "vacuum" or "partial vacuum" is herein referred to, the chilling effect of expansion of gases in tank 52 is readily obtained by the difference in pressure between tanks 48 and 52 and that difference may easily be maintained without even a partial vacuum. The term "vacuum" is, therefore, herein used to signify any difference in pressure affording the results stated. Also, it is to be borne in mind that the valves 51 are to be carefully manipulated by the operator incident to observance of the difference in pressure between tanks 48 and 52. Gauge 49 on tank 48 and a gauge 83 on tank 36 should be carefully watched as showing such difference in pressure, and the valves 51 opened or closed in greater or less number according to the capacity of tank 52 and conditions of relative pressure therein to effect the desired chilling expansion of injected vapors. The ends of pipes 50 opening into tank 52 may be formed and arranged in any acceptable manner susceptible of affording the results stated. It is, however, preferable to utilize an injector jet at the discharge end of each pipe 50. Such a jet as is commonly called a Venturi nozzle, as seen at 84 in the drawings, is found very effective, but other types of jets may be used and give effective results.

It will be noted that the pressure in the system is created and maintained by the expansive force of the vapors without the aid of a pressure or injection pump, and that the pressure being equalized oil is fed by gravity directly from the supply tank 1 into the system.

Since it is desirable that the lighter distillates and uncondensed gases passing down pipe 62 shall have maximum opportunity for blending with the column of liquid in tank 36, I prefer to provide a distributing pipe 85 with which the lower end of pipe 62 communicates, the pipe 65 extending along the tank 36 near the lowermost portion thereof and being formed with small apertures distributed along the length of the pipe 85 for the escape of the products descending through pipe 62. While the liquid drawn from pipe 39 may be considered the finished product, it is so only relative to the plant and process herein set forth. Of course, the product discharged through pipe 39 may be further refined or otherwise treated as found desirable.

It should be understood, of course, that the entire plant will be protected by such pressure gauges and temperature indicating apparatus as are commonly employed, and that they will be distributed throughout the plant wherever required though not illustrated in the drawings. Also, all parts will be heat-insulated where required and particularly the deflegmator 29 will be provided with means for controlling temperatures for maintaining effective operating conditions. That is to say, the upper portion of the deflegmator will be kept at that temperature which will effect discharge of gases to the condenser according to the character of the distillate desired to be recovered. Too high temperature may be reduced by the employment of cooling medium circulating coils located about or within the deflegmator, not illustrated; and cooling below the required temperature within the deflegmator will be prevented by exterior insulation. The deflegmator itself is of the form commonly in use.

The final products obtained, in their natural sequence, are a high quality, anti-knock hydrocarbon internal combustion motor fuel, a distillate of fuel oil of exceptionally good quality for fuel oil burners, and a superior quality of paving asphaltum or a good quality of commercial coke.

What is claimed is:—

1. An electrical heating unit for a circulating system of apparatus for recovery of hydrocarbon from carbonaceous material comprising resistors and housings for directing the flow of carbonaceous material in contact with the resistors in a continuous, uninterrupted stream, each resistor and housing being proportioned relative to each other for causing the stream to assume the form of a relatively thin film exposed to the heat of the resistor, each resistor being substantially impervious to hydrocarbon liquid at high temperature.

2. In apparatus for recovery of hydrocarbon fuel from carbonaceous material, an electrical heating unit comprising a tube, an electrical resistance bar therein and extending longitudinally thereof and having a terminal outstanding beyond the end of the tube, the bar being directly exposed to contact with the contents of the tube, and means for detachably closing said end of said tube, the resistance bar being substantially impervious to hydrocarbon fluid at high temperature.

3. In apparatus for recovery of hydrocarbon fuel from carbonaceous material, an electrical heating unit comprising a tube, an electrical resistance therein and extending longitudinally thereof and having a terminal outstanding beyond the end of the tube, the resistance being directly exposed to contact with the contents of the tube, and means for detachably closing said end of said tube, said resistance consisting of bar material, the resistance bar being substantially impervious to hydrocarbon fluid at high temperature.

4. In apparatus for recovery of hydrocarbon fuel from carbonaceous material, an electrical heating unit comprising a tube, an electrical resistance therein and extending longitudinally thereof and having a terminal outstanding beyond the end of the tube, the resistance being directly exposed to contact with the contents of the tube, and means for detachably closing said end of said tube, said resistance comprising a single bar of relatively solid material, the resistance bar being substantially impervious to hydrocarbon fluid at high temperature.

5. In apparatus for recovery of hydrocarbon fuel from carbonaceous material, an electrical heating unit comprising a tube, an electrical resistance therein and extending longitudinally thereof and having a terminal outstanding beyond the end of the tube, the resistance being directly exposed to contact with the contents of the tube, and means for detachably closing said end of said tube, said resistance consisting of bar material, and said bar material being dimensioned relative to the tube for spreading the liquid passing through the tube and maintaining it in a relatively thin sheet about the walls of the tube, the resistance bar being substantially impervious to hydrocarbon fluid at high temperature.

6. In apparatus for recovery of hydrocarbon fuel from carbonaceous material, an electrical heating unit comprising a tube through which the carbonaceous material is adapted to be moved, and an electrical resistance bar within the tube located to directly contact with the carbonaceous material passing therethrough, the resistance bar being substantially impervious to hydrocarbon fluid at high temperature.

7. In apparatus for recovery of hydrocarbon fuel from carbonaceous material, an electrical heating unit comprising a tube through which the carbonaceous material is adapted to be moved, and an electrical resistance bar within the tube located to directly contact with the carbonaceous material passing therethrough and proportioned to occupy sufficient of the space within the tube to maintain the carbonaceous material within the tube in a relatively thin sheet, the resistance bar being substantially impervious to hydrocarbon fluid at high temperature.

8. In apparatus for recovery of hydrocarbon fuel from carbonaceous material, electrical heating apparatus comprising a series of tubes arranged to form a column with the tubes substantially at right angles to the column, means of communication between the tubes, the said tubes being adapted to have carbonaceous material moved therethrough, and an electrical bar resistance arranged within each of the tubes in position for direct contact with carbonaceous material therein, the resistance bar being substantially impervious to hydrocarbon fluid at high temperature.

9. In apparatus for recovery of hydrocarbon fuel from carbonaceous material, electrical heating apparatus, comprising a series of tubes arranged to form a column with the tubes substantially at right angles to the column, means of communication between the tubes, the said tubes being adapted to have carbonaceous material moved therethrough, and an electrical bar resistance arranged within each of the tubes in position for direct contact with carbonaceous material therein, each of said bar resistances being detachably mounted for endwise removal from its respective tube, each of the resistance bars being substantially impervious to hydrocarbon fluid at high temperature.

10. In apparatus for recovery of hydrocarbon fuel from carbonaceous material, electrical heating apparatus comprising a series of tubes arranged to form a column with the tubes substantially at right angles to the column, means of communication between the tubes, the said tubes being adapted to have carbonaceous material moved therethrough, and an electrical bar resistance arranged within each of the tubes in position for direct contact with carbonaceous material therein, the means of communication between the several tubes being located at alternate opposite ends thereof for connecting the tubes in a series, each of the resistance bars being substantially impervious to hydrocarbon fluid at high temperature.

In testimony whereof I affix my signature.

RUSSELL CARTER.